United States Patent
Zhou et al.

(10) Patent No.: US 7,814,048 B2
(45) Date of Patent: Oct. 12, 2010

(54) KNOWLEDGE EXTRACTION FROM ONLINE DISCUSSION FORUMS

(75) Inventors: Ming Zhou, Bejing (CN); Jizhou Huang, Chongqing (CN)

(73) Assignee: Microsoft Corporation, Redmond, WA (US)

(*) Notice: Subject to any disclaimer, the term of this patent is extended or adjusted under 35 U.S.C. 154(b) by 332 days.

(21) Appl. No.: 11/464,373

(22) Filed: Aug. 14, 2006

(65) Prior Publication Data

US 2008/0046394 A1    Feb. 21, 2008

(51) Int. Cl.
G06F 7/00 (2006.01)
G06F 17/30 (2006.01)
G06F 15/18 (2006.01)
G06N 7/00 (2006.01)
G06F 19/00 (2006.01)
G06F 15/16 (2006.01)
G06F 9/46 (2006.01)
G06Q 10/00 (2006.01)

(52) U.S. Cl. ............... 707/602; 707/692; 707/723; 707/754; 702/1; 705/1.1; 705/10; 706/12; 706/59; 709/204; 709/206; 718/100; 718/103

(58) Field of Classification Search ............ 707/104.1, 707/5, 100, 602, 692, 723, 754; 718/100, 718/103; 715/733; 702/1; 706/12, 59; 709/204, 709/206; 705/1, 10, 500
See application file for complete search history.

(56) References Cited

U.S. PATENT DOCUMENTS

| | | | |
|---|---|---|---|
| 6,314,410 B1 | 11/2001 | Tackett | |
| 6,314,411 B1 | 11/2001 | Armstrong | |
| 6,363,301 B1 | 3/2002 | Tackett | |
| 6,505,157 B1 | 1/2003 | Elworthy | |
| 6,532,401 B2 | 3/2003 | Benson et al. | |
| 6,604,091 B2 | 8/2003 | Sadakuni | |
| 6,631,398 B1 * | 10/2003 | Klein | 709/206 |
| 6,754,647 B1 | 6/2004 | Tackett | |
| 6,901,390 B2 | 5/2005 | Mizokawa | |
| 6,961,700 B2 | 11/2005 | Mitchell | |
| 6,961,705 B2 | 11/2005 | Aoyagi | |
| 6,980,949 B2 | 12/2005 | Ford | |
| 6,983,231 B2 | 1/2006 | Noma | |
| 7,185,065 B1 * | 2/2007 | Holtzman et al. | 709/217 |
| 7,219,131 B2 * | 5/2007 | Banister et al. | 709/206 |
| 7,305,345 B2 * | 12/2007 | Bares et al. | 704/275 |
| 2002/0156551 A1 | 10/2002 | Tackett | |
| 2005/0015350 A1 | 1/2005 | Foderaro | |
| 2006/0026593 A1 * | 2/2006 | Canning et al. | 718/100 |
| 2007/0300159 A1 * | 12/2007 | Kordun | 715/733 |

OTHER PUBLICATIONS

Sara Kiesler, Carnegie Mellon University; Pittsburgh, Pennsylvania. "Fostering Common Ground In Human-Robot Interaction" 2005.

(Continued)

*Primary Examiner*—James Trujillo
*Assistant Examiner*—Cheryl M Shechtman
(74) *Attorney, Agent, or Firm*—Joseph R. Kelly; Westman, Champlin & Kelly, P.A.

(57) ABSTRACT

Concepts presented herein relate to extracting knowledge for a chatbot knowledge base from online discussion forms. Within a thread of an online discussion form, replies are selected based on structural features and content features therein. The replies can be ranked and used in a chatbot knowledge base.

17 Claims, 5 Drawing Sheets

OTHER PUBLICATIONS

B. Kleinjohann, L. Kleinjohann, J. Stroop. April 2006. "Pathfinder A Robot For Experiencing and Interacting in Distant Realities".

A. Powers, A. Kramer. "Eliciting Information From People With A Gendered Humanoid Robot". 2004.

K.S. Eklundh. 1998 "To quote or not to quote: setting the context for computer-mediated dialogues." In S. Herring (Ed.), Computer-Mediated Conversation. Cresskill, NJ: Hampton Press.

A.T. Fiore, S. Leetiernan and M.A. Smith. 2002. "Observed Behavior and Perceived Value of Authors in Usenet Newsgroups: Bridging the Gap". In Proceedings of the CHI 2002 Conference on Human Factors in Computing Systems. pp. 323-330.

A. Murakami, K. Nagao and K. Takeda. 2001. "Discussion Mining: Knowledge Discovery from Online Discussion Records". The First NLP and XML Workshop. pp. 31-38.

N. Matsumura, Y. Ohsawa and M. Ishizuka. 2002. "Profiling of Participants in Online-Community". Chance Discovery Workshop on the Seventh Pacific Rim International Conference on Artificial Intelligence (PRICAI). pp. 45-50.

R. Nishimura, Y. Watanabe and Y. Okada. 2005. "A Question Answer System Based on Confirmed Knowledge Developed by Using Mails Posted to a Mailing List". In Proceedings of the IJCNLP 2005. pp. 31-36.

L. Shrestha and K. McKeown. 2004. "Detection of Question-Answer Pairs In Email Conversations" In Proceedings of Coling 2004. pp. 889-895.

P. Tarau and E. Figa. 2004. "Knowledge-based conversational Agents and Virtual Story-telling". In Proceedings 2004 ACM Symposium on Applied Computing, 1:39-44.

W. Xi, J. Lind and E. Brill. 2004. "Learning Effective Ranking Functions for Newsgroup Search". In Proceedings of SIGIR 2004. pp. 394-401.

L. Zhou and E. Hovy. 2005. "Digesting Virtual "Geek" Culture: The Summarization of Technical Internet Relay Chats". In Proceedings of ACL 2005. pp. 298-305.

B.A. Shaware and E. Atwell. 2003. "Machine Learning From Dialogue Corpora To Generate Chatbots". In Expert Update Journal, 6(3): 25-29.

\* cited by examiner

US 7,814,048 B2

KNOWLEDGE EXTRACTION FROM ONLINE DISCUSSION FORUMS

BACKGROUND

A chatbot is a conversational agent that interacts with users using natural language sentences for information seeking, guidance, question answering, etc. Current chatbots use a set of templates that match a user's input and generate corresponding responses. The chatbots draw from a knowledge base of responses to interact with users. However, these chatbot knowledge bases are expensive and time consuming to develop and difficult to adapt for different domains The discussion above is merely provided for general background information and is not intended to be used as an aid in determining the scope of the claimed subject matter.

SUMMARY

Concepts presented herein relate to extracting knowledge for a chatbot knowledge base from online discussion forms. Within a thread of an online discussion forum, replies are selected based on structural features and content features therein. The replies can be ranked and used in a chatbot knowledge base.

This summary is provided to introduce some concepts in a simplified form that are further described below in the Detailed Description. This summary is not intended to identify key features or essential features of the claimed subject matter, nor is it intended to be used as an aid in determining a scope of the claimed subject matter.

DETAILED DESCRIPTION

Figure 1:
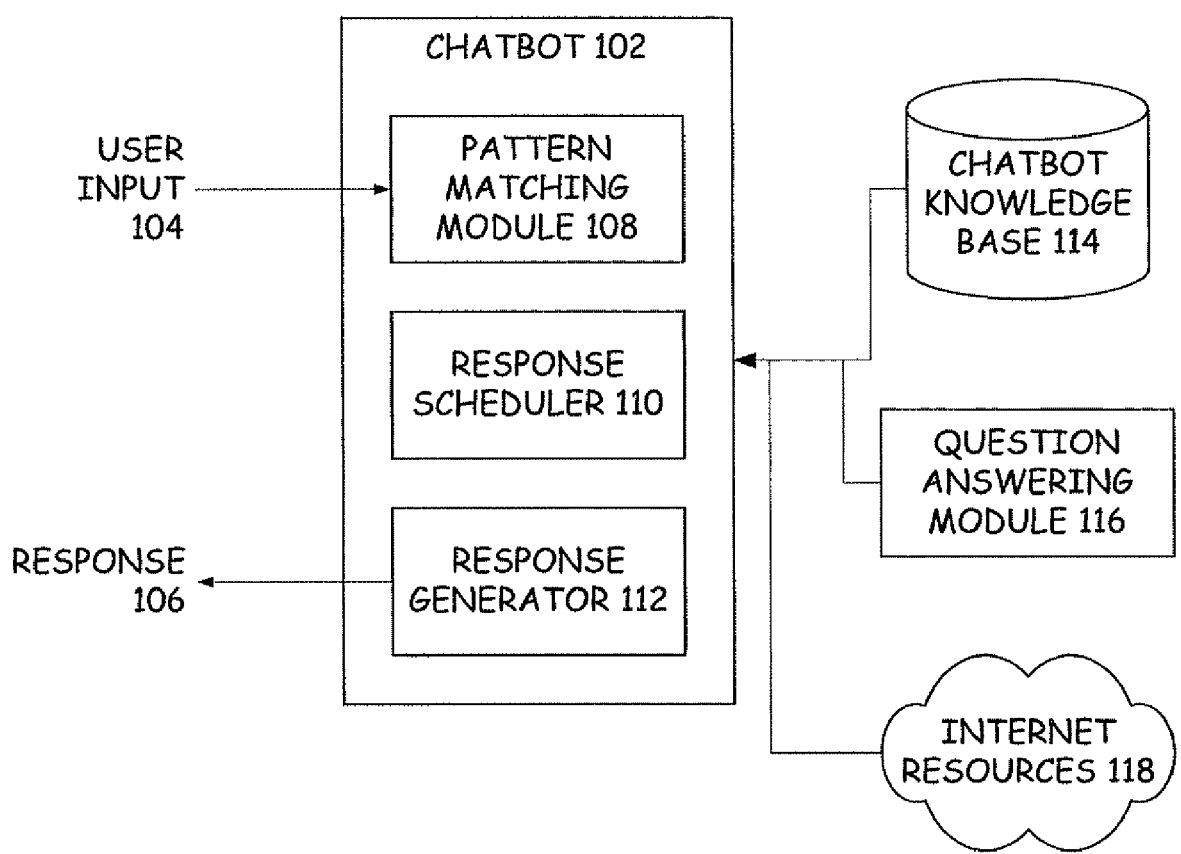
FIG. 1 is a block diagram of a chatbot environment.

FIG. 1 is a block diagram of a chatbot environment 100. Environment 100 includes a chatbot 102 that receives user input 104 and provides a response 106. Chatbot 102 includes a pattern matching module 108, a response scheduler 110 and a response generator 112. Pattern matching module 108 receives user input 104 and identifies keywords and/or syntax therein. This information is transmitted to response scheduler 110. Response scheduler 110 can access a chatbot knowledge base 114, a question answering module 116 and internet resources 118 using information from pattern matching module 108. For example, response scheduler 110 can identify a type of response that the user desires.

In a simple question/answer scenario, response scheduler 110 can use question/answering module 116 to answer factual and definitional questions by identifying suitable answers within internet resources 118. Additionally, response scheduler 110 accesses chatbot knowledge base 114 to provide dialog with a user such as greetings, appreciations, etc. Chatbot knowledge base 114 can also include responses provided to a user for a specified topic and/or specified domain. Response generator 112 receives information from response scheduler 110 to provide response 106 to the user.

An exchange of user input/responses can continue as desired. Using this conversational structure, a dialog is established between a user and chatbot 102. Based on the extent and content of information in chatbot knowledge base 114, a user can ask various questions to simulate a human-to-human interaction. For example, user input 104 could be a query, "How are you today?", where the chatbot response 106 could be, "I'm fine. How are you?" The chatbot response 106 is provided based on a template of responses in chatbot knowledge base 114 and/or question answering module 116 accessing internet resources 118.

In a specific domain such as a movie domain, query 104 could be, "Can you recommend a Western for me?" Drawing from chatbot knowledge base 114, chatbot response 106 could be, "Young Guns! and Young Guns 2!" A user is likely to have a positive experience with chatbot 102 based in part on chatbot knowledge base 114. By extracting relevant and quality replies from an online discussion forum, content in chatbot knowledge base 114 can be automatically generated.

Figure 2:
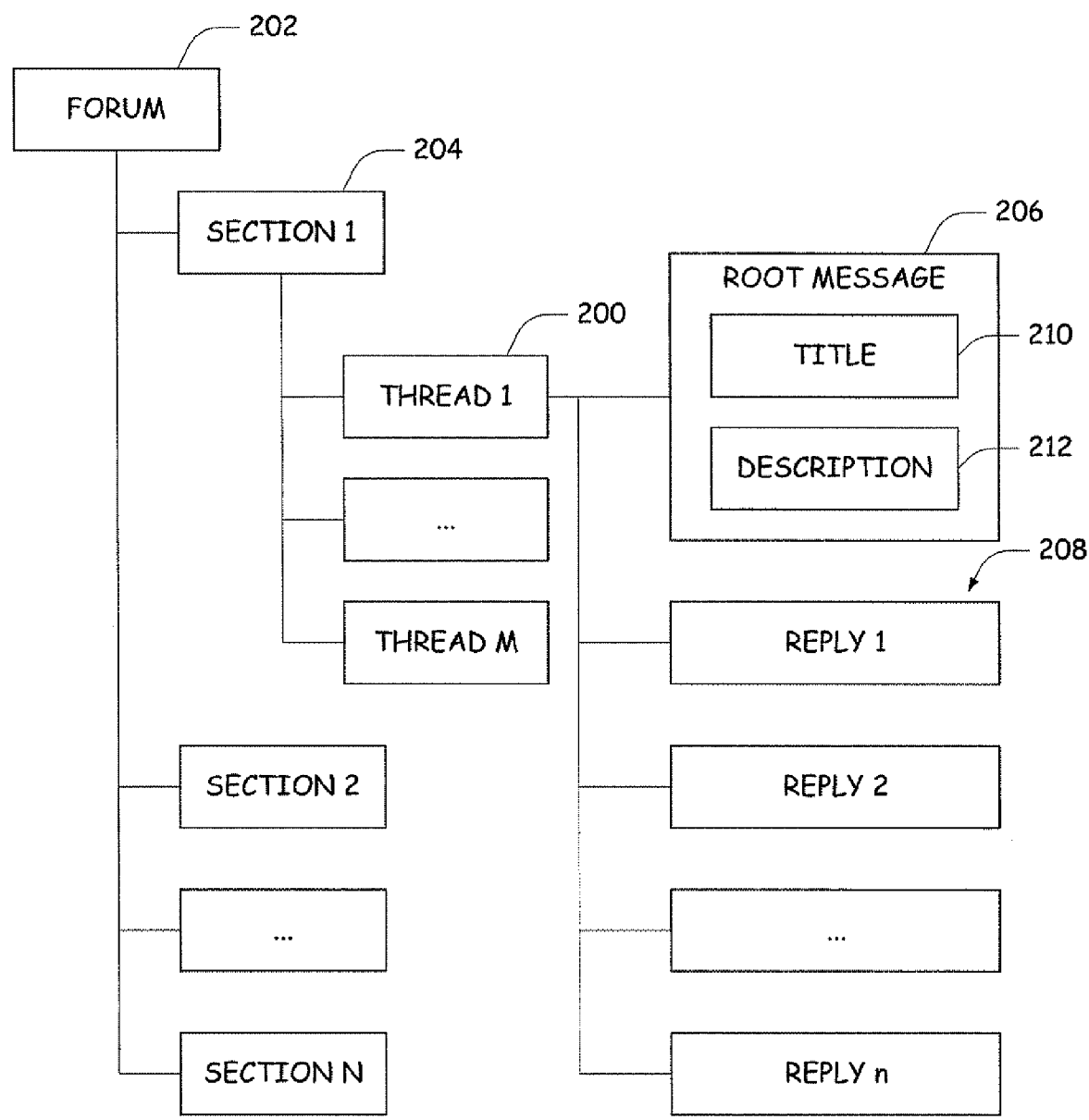
FIG. 2 is a diagram of a structure in a discussion forum.

FIG. 2 is a diagram of a thread 200 from an online discussion forum 202. An online discussion forum is a web-based community that allows people with similar interests to discuss topics and exchange information within a certain domain, such as sports, movies, etc. Forum 202 includes a plurality of sections, for example section 204. Each section includes a plurality of threads, such as thread 200. Threads within the forum discuss a particular topic within a domain based on a root message that has a title. Such forums are widely available on the internet and can be provided by web portals such as MSN, Yahoo! and Google as well as domain specific sites dedicated to a particular topic or collection of topics.

For example, thread 200 includes a root message 206 and a plurality of replies 208. The root message 206 includes a title 210 and a description 212. The plurality of replies 208 can include replies such as reply 1, reply 2 . . . reply n. Each reply can refer directly to the root message 206 and/or to another reply in thread 200. The root message 206 and each of the plurality of replies 208 are posted at a given time by a person in the community, which is known as the author. To use thread 200 in a chatbot knowledge base 114, selected replies that are relevant are extracted and ranked.

Figure 3:
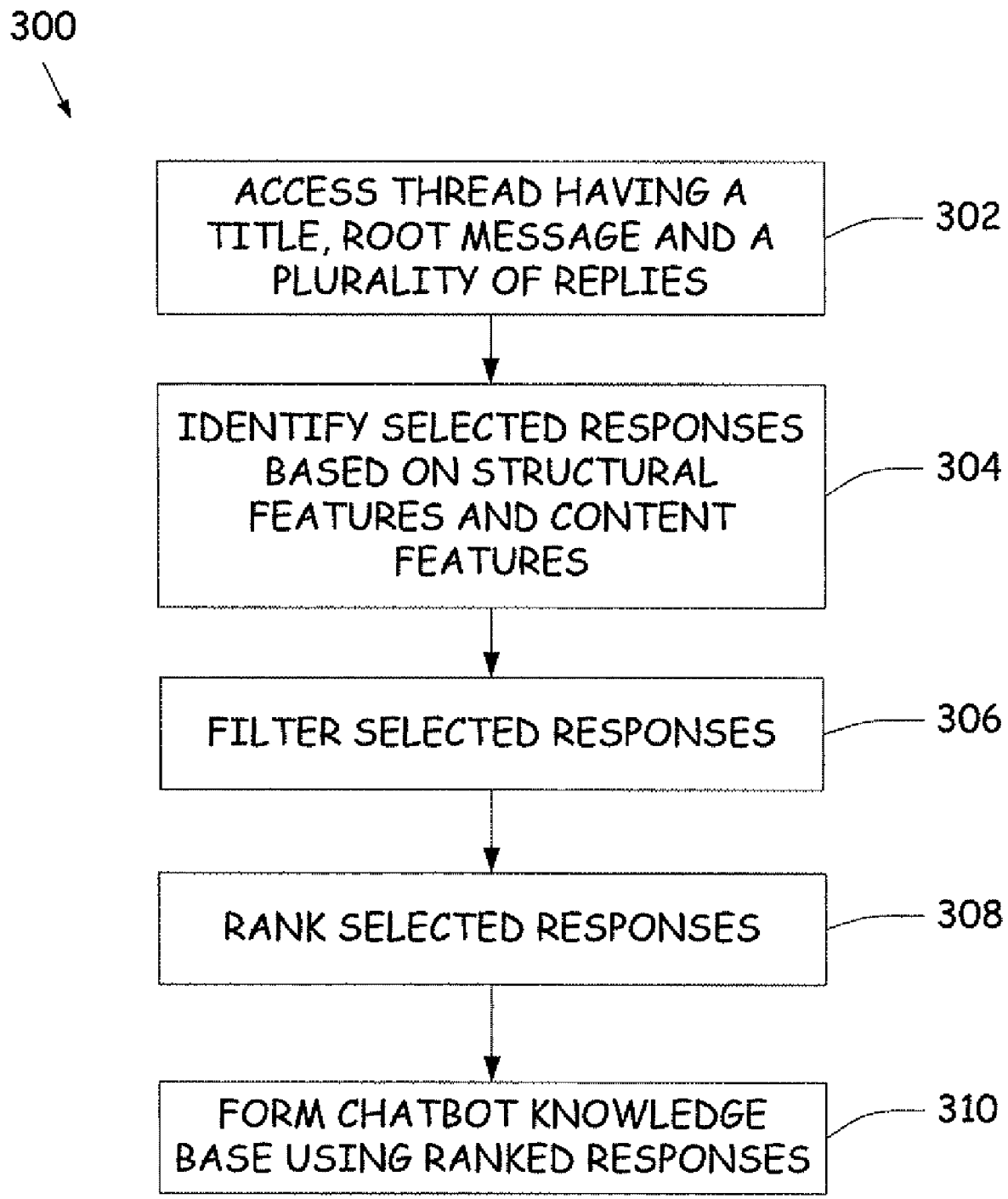
FIG. 3 is a flow chart of a method for extracting and ranking replies from a thread.

FIG. 3 is a flow chart of a method 300 for extracting and ranking replies from a thread. At step 302, threads (i.e. thread 200) in an online discussion forum are accessed. At step 304, selected responses are identified within the threads based on structural features and content features of the replies.

It is desirable for the selected replies to be of high quality. The structural features and context features are used to identify quality responses. Structural features are indicative of a reply in a context of other replies in the thread. For example, the structural features can relate to whether the reply quotes the root message, quotes another reply, is posted by an author of the root message and the number of replies between the author's reply and a previous reply provided by the author.

Content features relate to words in a particular reply. For example, the features can include a number of words, a number of content words and/or a number of overlapping words. Content words are words that have some relationship to words in the root message and overlapping words are words that also appear in the root message. Additionally, the content features can relate to domain specific terms and whether the reply contains another person's nickname from the thread. Table 1 below lists example features that can be identified in step 304. These features are examples only and other features can also be used.

TABLE 1

1. Structural Features
   1-1 Does this reply quote root message?
   1-2 Does this reply quote another reply?
   1-3 Is this reply posted by the thread starter?
   1-4 # of replies between same author's previous and current reply
2. Content Features
   2-1 # of words
   2-2 # of content words
   2-3 # of overlapping words
   2-4 # of overlapping content words
   2-5 Ratio of overlapping words to # of words
   2-6 Ratio of overlapping content words to # of words
   2-7 # of domain words
   2-8 Does this reply contain other participant's registered nicknames in forum?

At step 306, the quality responses are filtered. For example, a keyword list of obscenities, personal information terms and/or forum specific terms can be used to remove non-eligible responses. Additionally, similar and/or duplicate replies can be removed from the selected replies. The selected responses are ranked according to a ranking model at step 308. The ranking model can be based on a set of ranking features for each reply. The ranking features can relate to a number of times the reply is quoted within a thread and related to an author of a reply. At step 310, a chatbot knowledge base is formed using the ranked responses. This chatbot knowledge base can be utilized in the chatbot environment 100 of FIG. 1.

Figure 4:
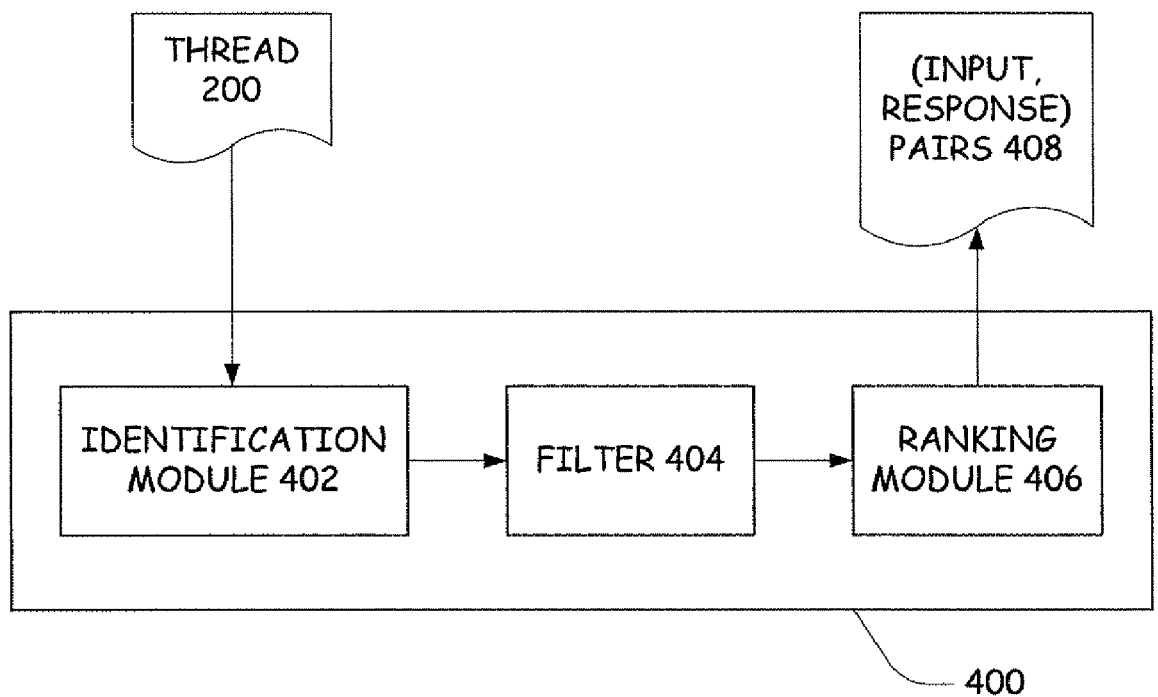
FIG. 4 is a block diagram of a system for extracting and ranking replies from a thread.

FIG. 4 is a block diagram of a system 400 for extracting and ranking replies within a thread based on method 300 of FIG. 3. System 400 includes an identification module 402, a filter 404 and a ranking module 406. Identification module 402 receives a thread, for example thread 200. Identification module 402 identifies selected replies based on features of the reply. For example, identification module 402 identifies structural and content features as discussed above.

Filter 404 can filter out terms such as obscenities, personal information terms and/or forum specific terms within the responses identified by identification module 402. Additionally, replies that are duplicated and/or redundant can be removed from the selected replies. Ranking module 406 ranks the selected replies and generates a list 408 of (input, response) pairs. This list 408 is used in chatbot environment 100 of FIG. 1. For example, pairs can be stored in chatbot knowledge base 114 wherein the inputs can be used by pattern matching module 108 to match patterns in user input 104 and the responses can be used by response generator 112 to provide response 106.

Figure 5:
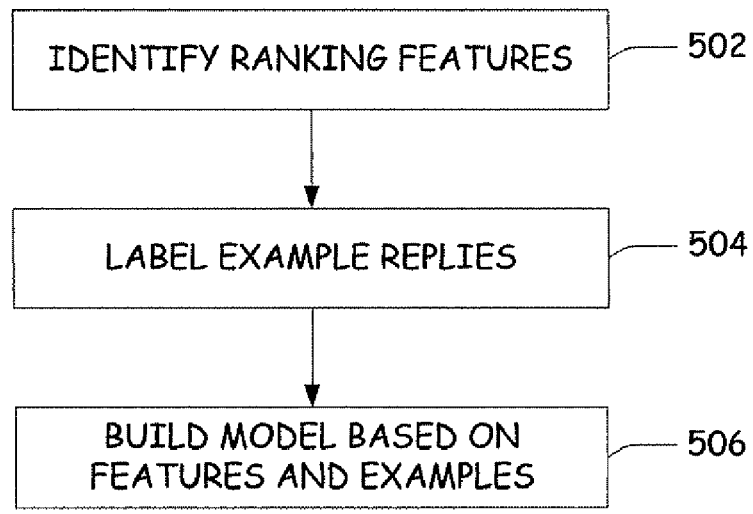
FIG. 5 is a flow chart of a method for training a ranking model used to rank replies in a thread.

FIG. 5 is a flow chart of a method 500 for training ranking module 406 of FIG. 4. Method 500 beings at step 502, wherein features for the ranking module 406 are identified. These features relate to a number of quotations for a reply within a thread and author reputation features. Table 2 below lists an exemplary set of features.

TABLE 2

1. Feature of being quoted number
   1-1 # of quotations this reply gets within the current thread
2. Features from the author of a reply TABLE 2-continued

|  |  |
|---|---|
| 2-1 | # of threads the author starts in the forum |
| 2-2 | # of replies the author posts to others' threads in the forum |
| 2-3 | Average length of the author's replies in the forum |
| 2-4 | The longevity of participation of the author |
| 2-5 | # of the author's threads that get no replies in the forum |
| 2-6 | # of replies the author's threads get in the forum |
| 2-7 | # of threads the author is involved in the forum |
| 2-8 | The author's total influence in the forum |
| 2-9 | # of quotations in the replies that are posted by the author in current thread |
| 2-10 | # of quotations of all the replies that are posted by the author in the forum |

The ranking features above are exemplary only and can be modified as desired to build ranking module 406. For example, structural and/or content features could be used for ranking module 406. Additionally, different methods can be used to identify these features and assign a value thereto. For example, feature 2-8 above can be determined as described in "Profiling of Participants in Online-Community" by N. Matsumura, Y. Ohsawa and M. Ishizuka, *Chance Discovery Workshop on the Seventh Pacific Rim International Conference on Artificial Intelligence* (*PRICAI*), pp. 45-50, 2002.

At step 504, example replies are labeled within an online discussion forum replies thread. These labels can be generated by a person to manually identify relevant replies in each thread. For example, each reply can include one of three (3) labels. The labels include a quality response label, a non-quality response label and an unsure label. After the example replies are labeled, the ranking module 406 is built based on the features identified in step 502 and the examples labeled in step 504. In one example, a ranking support vector machine is used to train the ranking module.

The above description of illustrative embodiments relates to a chatbot environment having a chatbot for conducting an interactive dialog with a user. Below is a suitable computing environments that can incorporate and benefit from these embodiments. The computing environment shown in FIG. 6 is one such example that can be used to implement the chatbot, identify selected responses from an online discussion forum and train a ranking model.

Figure 6:
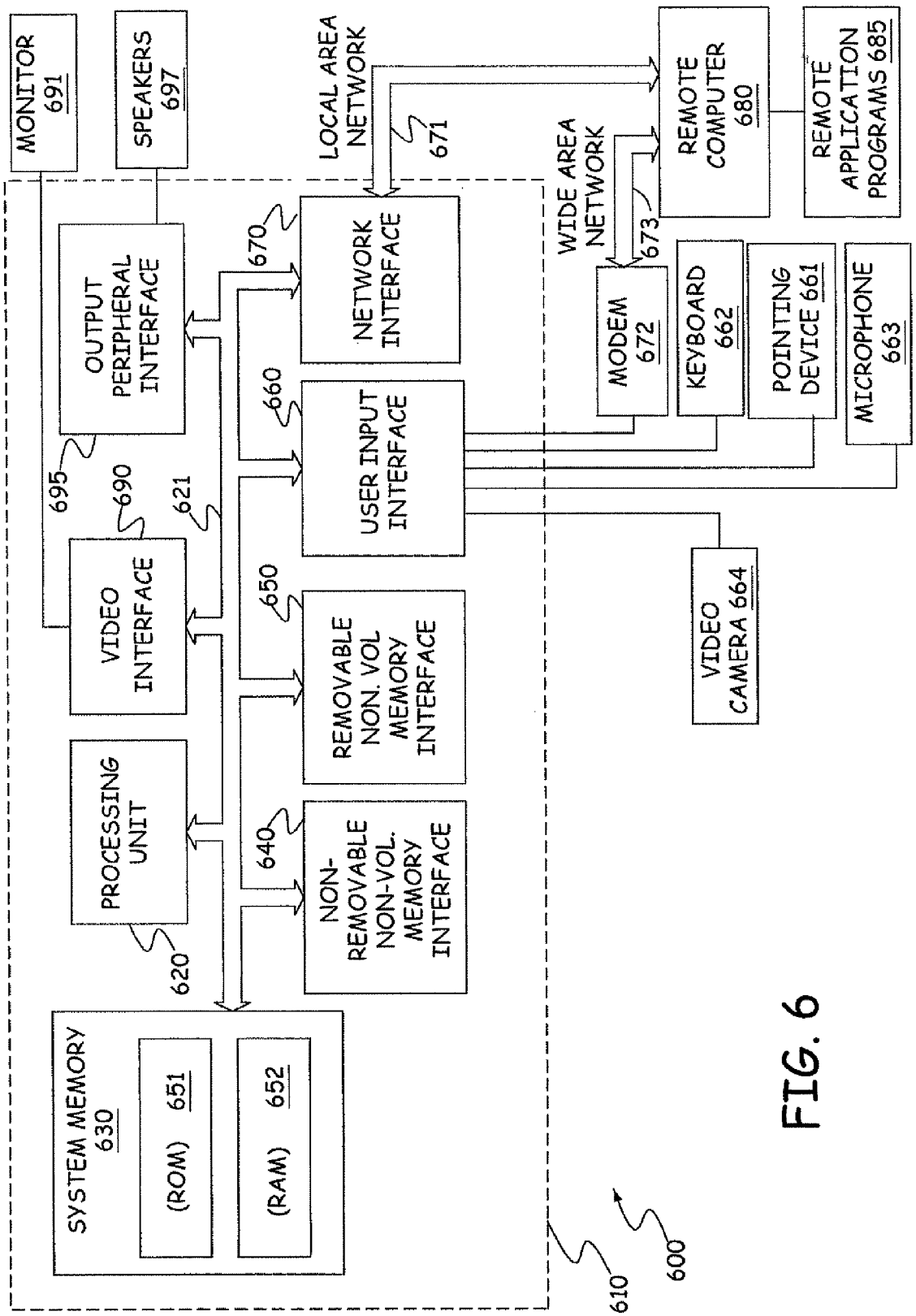
FIG. 6 is a block diagram of a general computing environment.

In FIG. 6, the computing system environment 600 is only one example of a suitable computing environment and is not intended to suggest any limitation as to the scope of use or functionality of the claimed subject matter. Neither should the computing environment 600 be interpreted as having any dependency or requirement relating to any one or combination of components illustrated in the exemplary computing environment 600.

Computing environment 600 illustrates a general purpose computing system environment or configuration. Examples of well-known computing systems, environments, and/or configurations that may be suitable for use with the service agent or a client device include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Concepts presented herein may be described in the general context of computer-executable instructions, such as program modules, being executed by a computer. Generally, program modules include routines, programs, objects, components, data structures, etc. that perform particular tasks or implement particular abstract data types. For example, these modules include pattern matching module 108, response scheduler 110, response generator 112, question answering module 116, identification module 402, filter 404 and ranking module 406. Some embodiments are designed to be practiced in distributed computing environments where tasks are performed by remote processing devices that are linked through a communications network. In a distributed computing environment, program modules are located in both local and remote computer storage media including memory storage devices.

Exemplary environment 600 for implementing the above embodiments includes a general-purpose computing system or device in the form of a computer 610. Components of computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data.

The system memory 630 includes computer storage media in the form of volatile and/or nonvolatile memory such as read only memory (ROM) 631 and random access memory (RAM) 632. The computer 610 may also include other removable/non-removable volatile/nonvolatile computer storage media. Non-removable non-volatile storage media are typically connected to the system bus 621 through a non-removable memory interface such as interface 640. Removable non-volatile storage media are typically connected to the system bus 621 by a removable memory interface, such as interface 650.

A user may enter commands and information into the computer 610 through input devices such as a keyboard 662, a microphone 663, a pointing device 661, such as a mouse, trackball or touch pad, and a video camera 664. For example, these devices could be used to provide input 104. These and other input devices are often connected to the processing unit 620 through a user input interface 660 that is coupled to the system bus, but may be connected by other interface and bus structures, such as a parallel port or a universal serial bus (USB). A monitor 691 or other type of display device is also connected to the system bus 621 via an interface, such as a video interface 690. In addition to the monitor, computer 610 may also include other peripheral output devices such as speakers 697, which may be connected through an output peripheral interface 695.

The computer 610, when implemented as a client device or as a service agent, is operated in a networked environment using logical connections to one or more remote computers, such as a remote computer 680. The remote computer 680 may be a personal computer, a hand-held device, a server, a router, a network PC, a peer device or other common network node, and typically includes many or all of the elements described above relative to the computer 610. The logical connections depicted in FIG. 6 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 6 illustrates remote application programs 685 as residing on remote computer 680. It will be appreciated that the network connections shown are exemplary and other means of establishing a communications link between computers may be used.

Although the subject matter has been described in language specific to structural features and/or methodological acts, it is to be understood that the subject matter defined in the appended claims is not necessarily limited to the specific features or acts described above. Rather, these specific features and acts described above are disclosed as example forms of implementing the claims.

What is claimed is:

1. A method, comprising:
accessing a thread from a discussion forum having a plurality of threads, the accessed thread having a root message with a thread title and a plurality of replies associated with the root message;
selecting replies from the plurality of replies in the accessed thread by analyzing structural features and content features of each reply, wherein the structural features provide context of a given reply as related to other of the plurality of replies to the root message and the content features include words related to the root message;
applying a filter to remove one or more replies from the previously selected replies by comparing a keyword list having a plurality of words, wherein the keyword list includes words indicative of personal identifying information, to content features in each of the selected replies and removing those replies that have at least one of the words indicative of personal identifying information in its content features;
ranking the replies previously selected from the plurality of replies in the accessed thread that remain after applying the filter using a ranking model based on ranking features of the replies;
generating a list of replies from the selected replies based on results of the ranking; and storing the list of replies in a data store to create a knowledge base for an automated conversational agent.

2. The method of claim 1 wherein the ranking features are based on determining how many replies provide a quotation from the reply to be ranked within its associated thread.

3. The method of claim 1 wherein the ranking features are based on an author of one of the selected replies.

4. The method of claim 3 wherein the ranking features are based on at least one of a number of threads started by the author in a discussion forum, a number of replies an author posts, an average length of replies posted by the author and a number of times an author is quoted in the thread.

5. The method of claim 1 and further comprising:
forming a chatbot knowledge base based on the selected replies.

6. The method of claim 1 wherein the structural features are indicative of a relationship between each reply and at least one of a root message in the accessed thread and another reply in the accessed thread.

7. The method of claim 1 wherein the content features are indicative of terms in a reply.

8. A method, comprising:
accessing a thread of a discussion forum having a root message and a plurality of replies to the root message;
identifying structural features for each reply of the plurality of replies, the structural features being indicative of a contextual relationship in the thread between a given reply and at least one of the root message and another reply of the plurality of replies;
identifying content features for each reply of the plurality of replies, the content features being indicative of terms used in the reply;
selecting replies from the plurality of replies based on the structural features and the content features for each reply;
applying a filter to remove one or more entire replies from the previously selected replies by comparing a keyword list having a plurality of words, including words that are indicative of personal identifying information to content features in each of the selected replies and removing those replies that have at least one of the words indicative of personal identifying information in its content features; and
ranking the selected replies that remain after applying the filter based on the structural features, content features, and labels applied to the replies, wherein the labels indicate a quality of the replies.

9. The method of claim 8 wherein the structural features relate to whether the reply includes text from the root message.

10. The method of claim 8 wherein the structural features relate to whether the reply includes text from another reply in the thread.

11. The method of claim 8 wherein the content features relate to a number of words in the reply.

12. The method of claim 8 and further comprising:
ranking the selected replies as a function of ranking features.

13. The method of claim 12 wherein the ranking features are based on a number of quotations a reply receives in a thread and an author of the reply.

14. A system having a computer readable storage medium storing a plurality of executable modules for processing threads in an online discussion forum, each thread having a title and a plurality of replies, the executable modules comprising:
an identification module that accesses the threads and selects some of the replies located within the threads as a function of structural features, the structural features being indicative of a relationship between replies in the context of the thread and content features contained within the replies;
a filter that removes one or more replies from the previously selected replies by comparing a keyword list having a plurality of words, including words that are indicative of personal information, to content features in each of the selected replies and removing those replies that have at least one of the words that are indicative of personal information in its content features;
a ranking module for ranking the previously selected replies based on ranking features contained therein and
a computer processor being a functional component of the system and activated by the identification module, the filter and the ranking module, to facilitate selecting, removing and ranking.

15. The system of claim 14 wherein the structural features are indicative of a relationship between each reply and at least one of a root message of the thread and another reply in the thread.

16. The system of claim 14 wherein the content features are indicative of terms in a reply.

17. The system of claim 14 wherein the ranking features are indicative of at least one of a number of quotations a reply receives within the thread and an author of the reply.

\* \* \* \* \*